United States Patent [19]
Butler

[11] 3,833,253
[45] Sept. 3, 1974

[54] ONE-MAN TRUCK-MOUNTED CAMPER

[76] Inventor: Truman G. Butler, 30 S. Lesueur St., Mesa, Ariz. 85204

[22] Filed: Dec. 11, 1972

[21] Appl. No.: 314,008

[52] U.S. Cl. ............... 296/23 MC, 296/69, 296/99, 5/24
[51] Int. Cl. ............................................. B60p 3/32
[58] Field of Search ........ 296/23 R, 23 MC, 64, 66, 296/69, 99; 49/74, 75; 5/2, 8, 9, 12, 24, 59 R, 59 B, 59 C

[56] References Cited
UNITED STATES PATENTS

| | | |
|---|---|---|
| 3,011,225 | 12/1961 | Alfred ................................. 49/75 |
| 3,329,976 | 7/1967 | Heller .................................. 5/24 |
| 3,508,786 | 4/1970 | Colville ............................. 296/99 |
| 3,652,121 | 3/1972 | Hjelm ............................... 296/99 |

Primary Examiner—Philip Goodman
Assistant Examiner—John A. Carroll
Attorney, Agent, or Firm—Warren F. B. Lindsley

[57] ABSTRACT

A short-bodied camper shell for mounting on the bed of a pickup truck includes hinged, louvered windows, an access door, locked storage area accessible from the truck bed, and removable cushions having rods cooperating with hangers mounted to the interior of the camper to form either two seats, a cot, a storage platform, or a combination of a table and one seat.

5 Claims, 5 Drawing Figures

ONE-MAN TRUCK-MOUNTED CAMPER

BACKGROUND OF THE INVENTION

This invention relates generally to a portable shell for use as a camper placed on a pickup truck and more particularly to a short-bodied or partial camper shell usable as a camper for one or two people and as a storage shed.

FIELD OF THE INVENTION

The pickup truck of yesteryear was a tool used by the working man to carry equipment and supplies to the work area. Today the pickup truck is also used as a recreational vehicle to carry the owner to wilderness areas. Thus the camper shell was designed to accommodate the recreational use. However, the truck can be used for both purposes.

PRIOR ART

Prior art camper shells were designed to completely cover the bed of the pickup truck in which the camper shell was placed. Using the large shell completely preempted the bed of the pickup truck. Thus, since pickup trucks are also useful for carting large items, various elaborate devices were designed for ease of removal of the camper shell when the pickup truck was needed for hauling.

Also the prior art camper shells were designed to carry and supply housing for several persons and thus elaborate fixtures were adapted to the interior such as built-in tables for use by the occupants of the camper. These fixtures prevented usage of the camper as a storage unit in the event items such as valuable tools and equipment were needed to be stored on the pickup truck.

Many times one person only uses the truck for outdoor activities as well as a work tool. The person often wishes to combine outdoor activities with work. Former camper shells made this difficult. Thus what is needed is a camper shell which can be used as a camper for sleeping and such by one person, while being adaptable to be used as a storage shed, both being available without preventing use of the pickup truck for hauling material without removing the camper shell.

SUMMARY OF THE INVENTION

The camper according to the present invention comprises a short-bodied shell for mounting on the bed of a pickup truck. The camper includes hinged, louvered windows providing access to the interior of the camper from both sides of the truck, an access door to the interior from the truck bed, locked storage areas accessible from the truck bed and located near the bottom of the camper shell alongside of the access door, and a plurality of cushions. The cushions include first means to removably cooperate with second means fastened to the interior of the camper to form a bench seat, a cot, a table or a storage platform.

The camper of the present invention provides a sleeping enclosure suitable for one man or passenger space for two without greatly restricting the usage of the truck. The truck having a camper according to the present invention can be used for both a recreational vehicle and a work vehicle, or as a work vehicle with a locked storage area, or as a work vehicle complete with its own temporary living quarters, or as a five passenger vehicle.

It is, therefore, an object of the present invention to provide an enhanced slide-in camper for use in cooperation with a pickup truck.

It is another object of the present invention to provide an enhanced slide-in camper having a capability to be used as both living quarters and a storage area.

It is yet another object to provide a portable, slide-in camper having hinged, louvered side windows for access to the interior of the camper to place and remove items to be stored in the camper.

It is a further object to provide a portable, slide-in camper having the capability of being easily converted from a storage area to living quarters.

It is yet a further object to provide a portable, slide-in camper having means to removably fasten cushions within the camper to form a bench, a table, a storage shelf, or a combination of the former, or a cot.

These and other objects of the present invention will become apparent to those skilled in the art as the description proceeds.

BRIEF DESCRIPTION OF THE DRAWING

The various novel features of this invention, along with the foregoing and other objects, as well as the invention itself both as to its organization and method of operation, may be more fully understood from the following description of an illustrated embodiment when read in conjunction with the accompanying drawing, wherein.

DESCRIPTION OF THE PREFERRED EMBODIMENT

Figure 1:
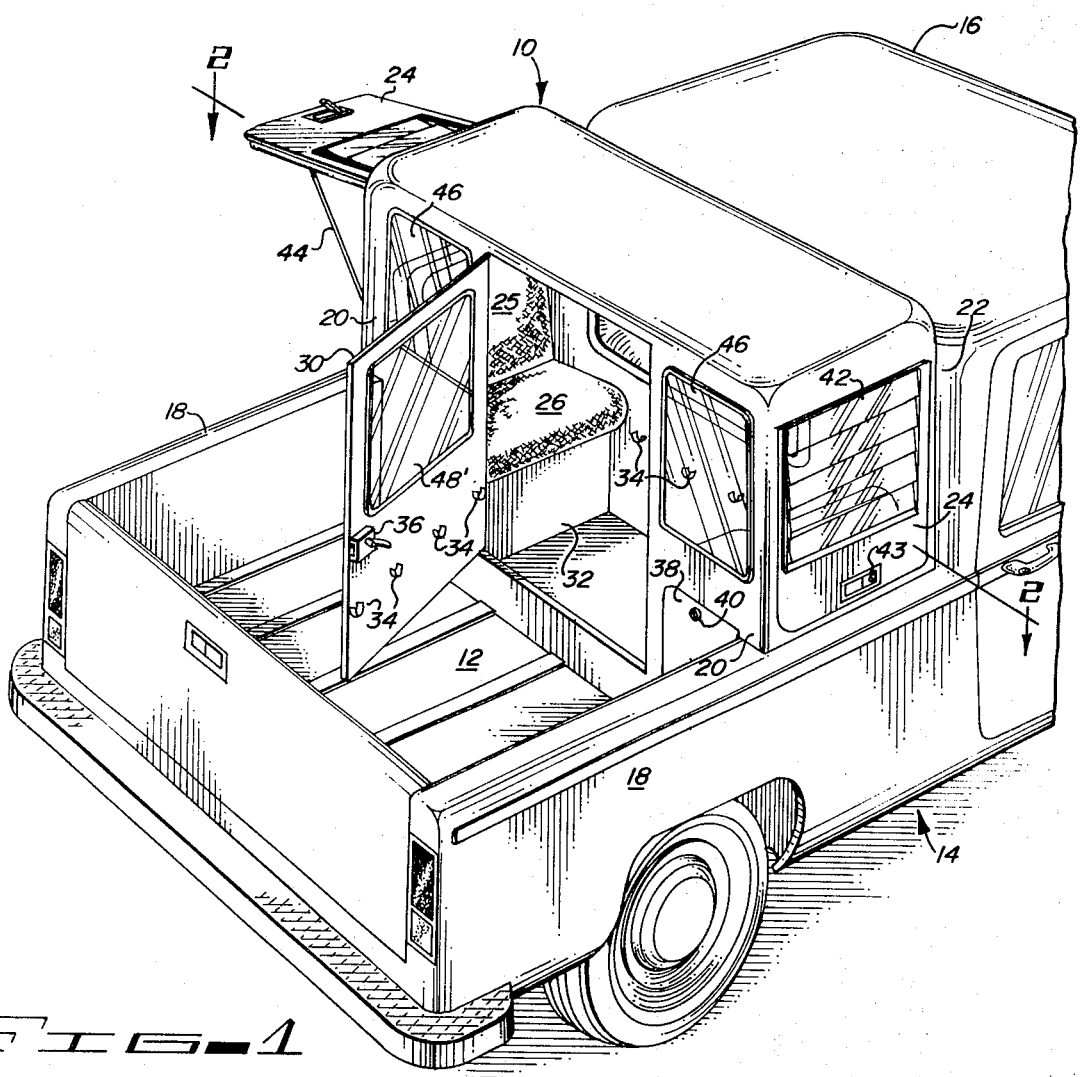
FIG. 1 is an elevated view of the present invention as adapted for placement in the bed of a pickup truck.

Referring to FIG. 1, the slide-in camper or camper shell 10 according to the present invention comprises a short-bodied portable camper shell designed to be installed in a bed 12 of a standard pickup truck 14 next to the cab 16. The camper 10 is a slide-in type formed to fit in the bed 12 of the pickup truck 14 across the width of the truck between side panels 18 of the bed 12. The camper 10 includes wing portions 20 that overhang the edge of the truck. The width of the camper 10 therefore is the same as the width of the truck 14. The camper 10 is basically "one-man" in length, that is, the camper 10 can be approximately 3 feet in length, more or less, measuring from the cab 16 along the length of the bed 12, just sufficient for one person to sit or lay down comfortably. The camper or camper shell 10 therefore includes a front section for placing against the cab 16 of the pickup truck 14, a rear section for facing the bed 12 of the pickup truck 14, and side sections including wing portions 20 for placing between and over the side panels 18 of the bed 12. A boot 22 can be used to interconnect the cab 16 of the truck 14 to the interior of the camper 10 by fastening the boot 22 to an opening in the front of the camper shell 10. If the interconnecting boot 22 is used, the rear window of the pickup truck is removed and a direct opening is provided between the cab 16 and the camper 10.

The camper shell 10 includes louvered windows 24 mounted to the side sections of the camper shell 10, a plurality of removable seat cushions 25, 26, 27 and 28, a hinged rear access door 30, and two storage bins 32. Means such as a plurality of U-shaped hangers 34 are provided to hold the seat cushions to the camper front and back to form either a pair of chairs, or benches, a cot for sleeping, or a table or storage shelf. The positioning of the cushions for each use will be described later, particularly in the discussion of FIGS. 3 and 4.

The hinged rear access door 30 provides access to the interior of the camper 10. A latch 36 is provided to lock the access door 30 to prevent access to the camper 10. Each storage bin 32 is accessible from the truck bed 12 through a hinged door 38. Each hinged door 38 includes a lock 40 at the top of the door 38, see FIG. 3, to provide security to the storage area 32. The storage bin or areas 32 provide a use for the otherwise nonusable area located beneath the seating section of the camper 10.

The louvered windows 24 provided in the side sections in the wing portions 20 can be equipped with crank handles (not shown) interior to the camper shell 10 for opening the windows. The opening and closing of louvered windows by the use of crank handles is well-known in the art and thus need not be further discussed here.

The louvered side windows 24 include hinges 42 at the top to the camper shell and a locking latch handle 43. The entire side window 24 can be pivoted around the hinge 42 and suspended in the open position by a support 44 as noted in FIG. 1 with the left window 24 of the camper 10. The side windows 24 therefore provide an access to the camper interior from the side of the truck via the locking latch 43. This is especially useful when the camper is used to store long items such as pipes or lumber since the items can be retrieved from the side of the truck without entering the camper. The back side of the camper also includes smaller windows 46 located on each side of the door 30, as well as a window 48' in the door 30 to the camper 10.

Located in the interior to the camper 10 is the plurality of removable cushions 25–28, four in number shown in FIG. 1, two on each side forming a seat cushion and a back cushion of a built-in bench located on each side of the camper. Each cushion is preferably of an equal size, "one-man" wide to fit the length of the camper between a front wall and a rear wall of the camper and a length such that all of the cushions will, while laying flat, cover the interior width of the camper.

Figure 3:
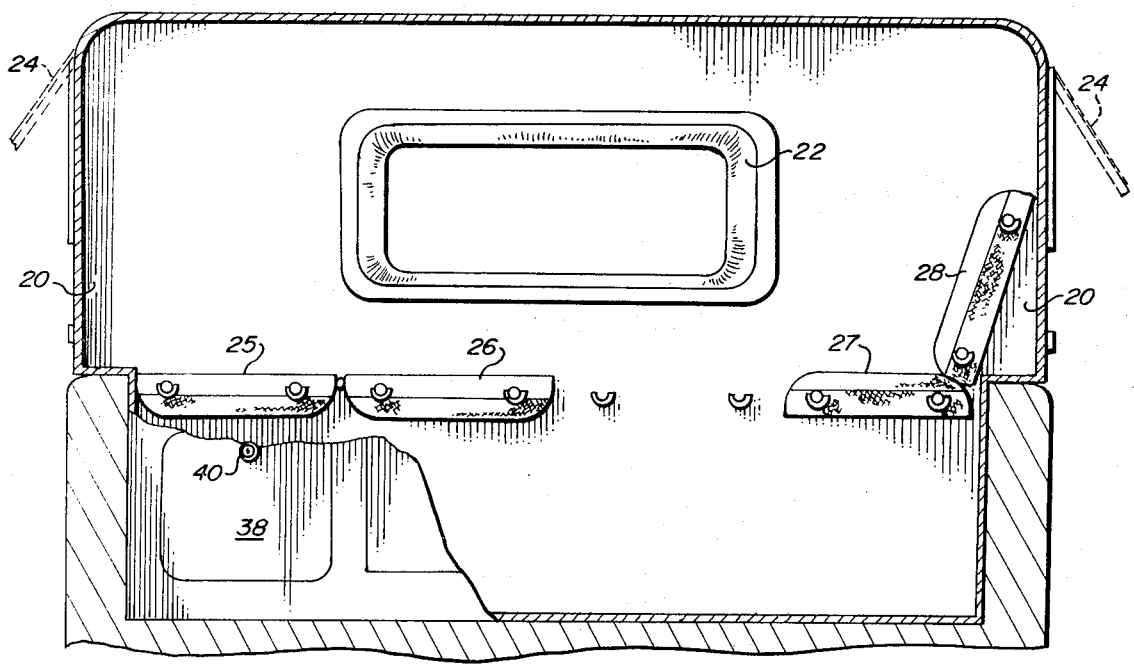
FIG. 3 is a side sectional view taken along lines 3—3 of FIG. 1 showing another view of the interior of the present invention.
Figure 4:
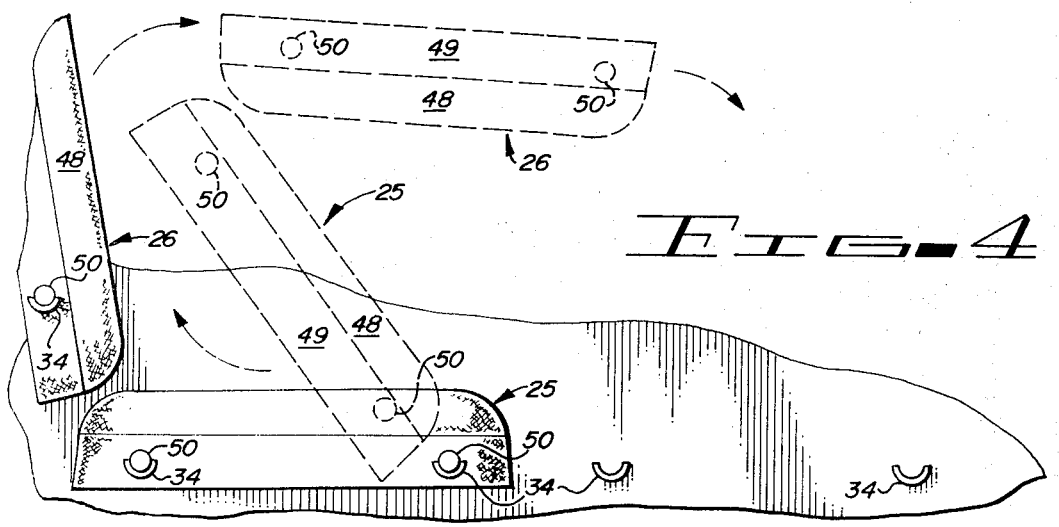
FIG. 4 is a detailed view of the seat cushions showing the operation for use in seating and storage.

Each cushion 25–28 shown in the FIGS. includes a padded portion 48 and a solid back portion 49, see FIG. 4. The soft padded portion 48 can be upholstered by a plastic material such as naugahyde for ease of cleaning covering foam rubber padding. The back portion 49 can be formed from wood, plastic or metal depending on the usage in the storage position. The back portion 49 of the cushions includes mounting means shown as rods 50 mounted at the top and bottom of both sides of each cushion 25–28. The rods 50 can be formed of conduit pipe with plastic end caps to prevent marring of the interior surface of the camper. All four cushions can be formed in the identical manner to provide for interchangeability and to obviate the necessity of marking the location of each cushion. Hanging means are provided on the front and back on the interior of the camper including the rear door 30 to hold the cushions on both front and back side of the interior. Thus referring to the Figs., especially referring to FIG. 3, hanging means are shown holding the seat cushion 28 of the right seat in the upright position to form the back of the chair. The hanging means according to the preferred embodiment are U-shaped hangers 34 such as closet rod hangers. Similar hangers are provided on the front of the camper to provide a four-point support for the bench chair back. Spaced along the front wall and rear wall including the door 30 on the interior of the camper is a series of the U-shaped hangers 34. Hangers 34 are also located to mount another cushion 27 to form the seat of the chair. Likewise similar hangers are located on both the front and rear interior sections of the camper to support cushion 27. These hangers 34 cooperate with the rods 50 fastened to each side of each cushion to hold the loose cushions in place to form the cushioned bench, to form the cot for sleeping with the cushions facing upwards, and to form the platform or table with the seat cushions facing downward.

Figure 2:
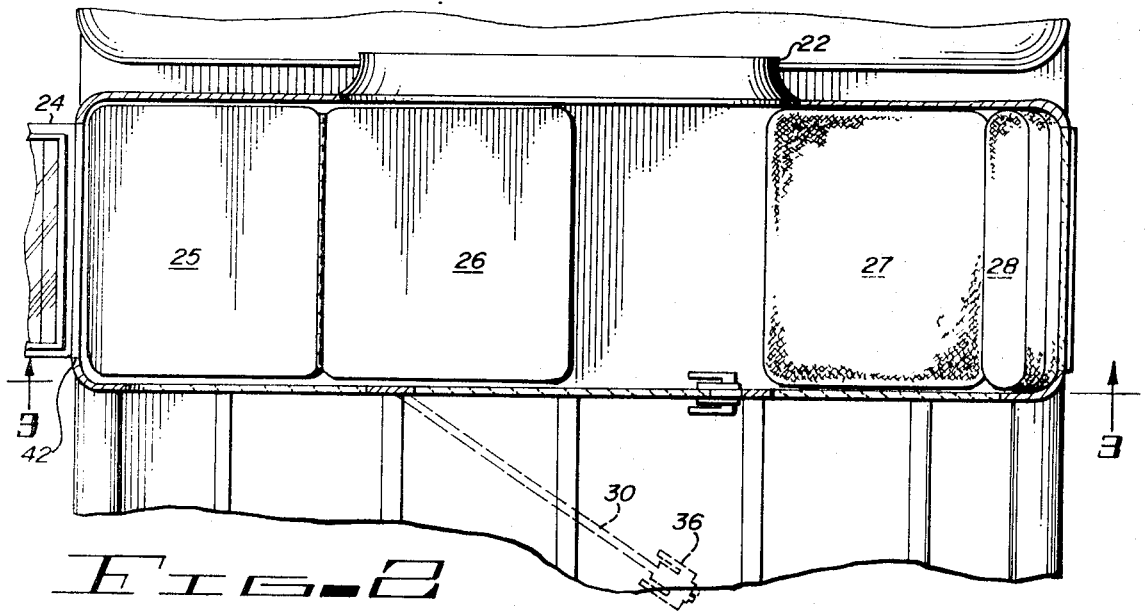
FIG. 2 is a top sectional view taken along lines 2—2 of FIG. 1 showing the interior of the present invention.

FIG. 2 shows the cushions 27 and 28 on the right side placed into the U-shaped hangers 34 to form the bench seat. The cushions 25 and 26 on the left side are placed into the hangers 34 to form a table for instance. FIG. 3 shows the positioning of the hangers 34 with the cushions 27 and 28 again on the right placed in an upright position to form a bench seat. the placement of the hangers 34 for this position is as indicated. On the left side of FIG. 3, the position of the hangers 34 is shown for placing the cushions 25 and 26 with the backs 49 of the cushions facing upward to form a platform such as a table or work bench operable from the bench.

FIG. 4 shows the positioning of the hangers 34 and rods 50 to turn the cushions 25 and 26 from a bench to a platform. It is obvious that by merely inverting the cushions 25–28 with the cushioned front portion 48 upwards, a soft cot can be formed from the same cushions forming the chair and the table. Thus for one person, the camper according to the present invention can be used as a place to sit and relax, a place to work while seated, using one set of cushions as a seat and one set as a bench, a place to eat, using the same arrangement, and a place to sleep, using all of the cushions as a platform with the soft cushioned portion facing upward. The interior of the camper can also be used to store items such as lumber by placing all of the cushions with the solid back facing upward and stacking the items on the platform formed by the cushions.

The different placement of the cushions will now be explained. In FIG. 1, the cushions are shown forming two bench seats, one on each side of the camper. For use as a bench seat, the cushions 25–28 are placed with the rods 50 placed in the hangers 34 as shown with the right side of FIG. 3. It is obvious that the cushions 25 and 26 on the left side of the camper in FIG. 1 are placed in the appropriate hangers to form a bench as shown in FIG. 4.

In FIG. 2, the cushions 25 and 26 on the left are shown in the position to form a table or work platform associated with the bench on the right side of the Fig.

In this position, the cushions 25 and 26 have their rods 50 cooperating with the hangers 34 as shown in FIG. 3.

The conversion of the cushions from a bench arrangement to a platform or table is shown in FIG. 4. Referring to FIG. 4, the seat cushion 25 is removed and reversed with the back portion 49 facing in an upward direction. The cushion 26 forming the back support of the bench is removed from its hangers 34 and placed into the hangers 34 adjacent to the first cushion 25. Thus the two cushions formerly forming the seat are placed as shown in FIG. 3 to form a platform or a table. To complete the other half of the platform, the cushions 27 and 28 on the right side of the camper as shown in FIG. 3 can be likewise inverted to complete the platform across the entire width of the camper.

It is obvious that to form a cot, it is merely necessary to invert all four cushions with the soft padded portion 48 facing upwards. The rods 50 can be placed in the same hangers 34 as that used to form the platform. Thus two bench seats can be formed by positioning the cushions as shown in FIG. 1, a bench seat and a table can be formed by positioning the cushions as shown in FIG. 3, the platform can be formed by placing all of the cushions with the back portion facing upwards as shown in FIGS. 3 and 4 and a cot can be formed by inverting all of the cushions from the platform with the back portions facing upward to place the soft padded portion upward.

Figure 5:
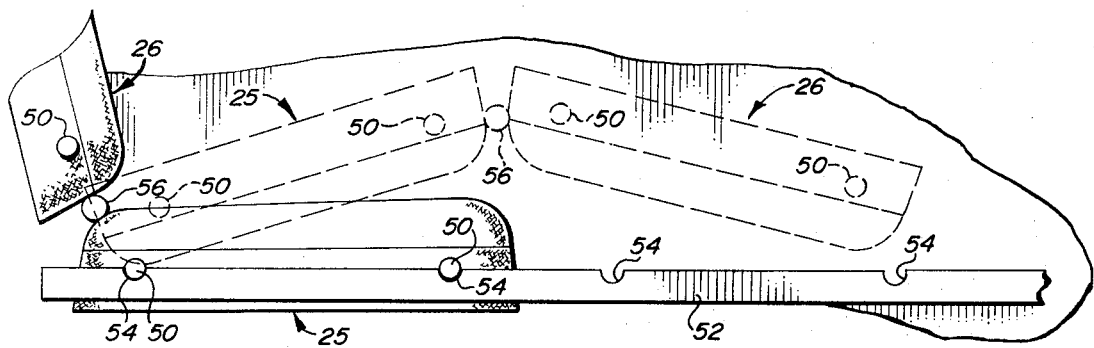
FIG. 5 is a detailed view of the seat cushions showing the operations thereof in a second embodiment of the invention.

The principles of the present invention have now been made clear in an illustrated embodiment. There will be immediately obvious to those silled in the art many modifications of structure, arrangement, proportions, the elements, materials and components used in the practice of the invention. For instance, the U-shaped hangers 34 can be replaced with a track 52, see FIG. 5, fastened across the front of the camper and across the door 30 and wings 20 alongside of the door 30. The track 52 can have notches 54 formed therein into which the rods 50 on the cushions can be placed to keep the cushions from sliding along the track. The back of the benches can be held, if desired, by the U-shaped hangers 34 as previously described. Also two cushions might be hinged together by a hinge 56 to form a better match between the cushion 25 used as the seat of the bench and the cushion 26 used as the back of the bench. Likewise the mounting means could be square tubing instead of the round rods 50 shown in the Figs.

The appended claims are, therefore, intended to cover and embrace any such modifications, within the limits only of the true spirt and scope of the invention.

What I claim is:

1. A short-bodied camper for use with a pickup truck having standard items such as, among others, a cab, a rear window in said cab, a pickup bed for hauling articles, and side panels fastened to a chassis of the truck to enclose the bed of the truck on the sides, said camper comprising, in combination:
    a shell having a height approximately equal to the height of the cab of the truck from the bed to the top of the cab, a width equal to the width of the bed of the truck up to the height of the side panels and a width equal to the width of the cab above the height of the side panels forming wing sections, and a length approximately equal to the width of a person, said shell having openings therein;
    an access door mounted by hinges to a rear section to cover one opening of said shell, said access door having a window area therein;
    a first locking latch mounted in said access door for latching the access door to said shell when the access door is closed and for preventing access to the shell interior when locked;
    a pair of window panels, each window panel being hingedly mounted to a side section of said shell in the winged portion;
    a plurality of removable cushions, each cushion being of a width approximately the same as the length of said shell and length such that the plurality of cushions collectively extends the width of the shell;
    a plurality of mounting means fastened to each of said plurality of cushions;
    a first hanging means fastened to the interior of said shell on both front and rear sections at a chair height to cooperate with the mounting means of two of said plurality of cushions to form two seat sections at the sides of said shell;
    a second hanging means fastened to the interior of said shell on both front and rear sections, with a set of hanging means fastened one above the other at an inclusive angle to form a back section for each of the two seat sections;
    each of said plurality of removable cushions being formed with a soft cushioned facing and a hard surfaced back;
    said plurality of mounting means including a pair of rods protruding from each side of each removable cushion to cooperate with said first hanging means to form two backs of bench chairs and to cooperate with said second hanging means to form two seats cooperating with each back of the bench chairs; and
    a third hanging means mounted to the front and access door interior sections of the shell and at the same level as the second group of hangers, said cushions forming a cot by placing the cushions forming the backs of the bench seats into said third hanging means, with all cushions having their soft cushion facing in the upward direction, said cushions forming a platform when all cushions have their hard-surfaced backs facing upward.

2. A short-bodied camper as defined in claim 1 wherein each of the pair of window panels comprises a louvered window including a locking latch mounted to each window panel for preventing the pivoting of each window panel at the hinge, said locking latch accessible from without said shell for releasing the latch to allow the opening of the window panel by pivoting at the hinge, said shell further including a means for holding the window panels in the open position.

3. A short-bodied camper as defined in claim 1 further comprising:
    a storage area beneath each of the seat sections formed by the removable cushions;
    a storage area door fastened to the rear section of the shell by hinges and covering openings in the rear section providing access to each of said storage areas; and
    locking means mounted to each of said storage area doors to lock and thereby prevent access to said storage areas without a key to said locking means.

4. A short-bodied camper as defined in claim 1 wherein said first, second and third hanging means are a plurality of U-shaped hangers cooperating with said rods.

5. A short-bodied camper as defined in claim 1 wherein said first hanging means ia a plurality of U-shaped hangers and said second and third hanging means is a pair of tracks mounted to the front and rear wall interior to the shell sectioned across said access door, said track having notches formed therein to cooperate with said rods of said cushions to form the cot and the platform.

* * * * *